United States Patent Office 3,203,780
Patented Aug. 31, 1965

3,203,780
HERBICIDAL COMPOSITIONS AND METHOD
FOR THE MANUFACTURE THEREOF
George W. Luvisi, Brookfield, and Thomas C. Noheji, Downers Grove, Ill., assignors to Nalco Chemical Company, a corporation of Delaware
No Drawing. Filed Jan. 28, 1959, Ser. No. 789,479
16 Claims. (Cl. 71—2.4)

This application is a continuation-in-part of our copending application Serial No. 408,306, filed February 4, 1954, now abandoned.

This invention relates to new and useful herbicidal compositions and the method of destroying noxious vegetation by using said compositions.

In the past many efforts have been made to find herbicidal compositions which are effective in the destruction of noxious vegetation. The 1,3-substituted urea, 3-parachlorophenyl-1,1-dimethyl urea, herein referred to by its trade name CMU, has proven to be an excellent soil sterilant type herbicide, but it is difficult to apply to vegetation since the powdered form in which it is sold makes it dusty and it is not soluble in most common solvents including water.

One of the objects of the present invention is to provide new and improved herbicidal compositions which are capable of destroying vegetation.

Another object is to provide new and improved substantially oil-free granular free-flowing herbicidal compositions which may be readily applied to noxious vegetation.

A further object is to provide a new and improved herbicidal composition containing a 1,3-substituted urea.

A still further object of the invention is to provide a new and novel method for the destruction of grasses.

Still another object is to provide new and improved herbicidal compositions which will destroy plant life for long periods of time without reapplication. Other objects will appear hereinafter.

In accordance with the invention it has been found that a boron compound admixed with a phytotoxic 1,3-substituted urea and applied to noxious vegetation has a residual killing effect not possessed either by the boron compound alone or by the phytotoxic 1,3-substituted urea alone, and which is substantially greater than the sum of the individual effects.

A feature of the invention is the provision of compositions which are granular and free-flowing and readily applied by the use of commercial spreader equipment, such as a fertilizer spreader. These compositions are essentially oil-free and are preferably prepared by mixing the boron compound and the phytotoxic 1,3-substituted urea with water and a binder, followed by granulating and drying.

In the preferred practice of the invention, borax or borascu (crude borax ore), both of which are hydrated compounds containing approximately ten mols of water, are added to a mixer together with the phytotoxic 1,3-substituted urea, preferably with a binder such as dextrin, and enough water is added to make the product damp and workable. It is sometimes desirable to add an excess of water so that the mixture is thoroughly wet. The product from the mixer is granulated and dried. The preferred procedure in the preparation of the compositions of the invention is a continuous operation involving mixing the components of the composition, granulating while wet and then drying.

In many cases, it is desirable to include a small minor proportion, within several percent, of a wetting agent in the composition. The wetting agent functions to allow the water to admix freely with and wet the surface of the physical mixture which in turn permits the particles to be readily granulated. Detergent-type wetting agents may be employed, as, for example, those described in the article entitled, "Synthetic Detergents—Up-to-Date—II," by John W. McCutcheon, Soap and Sanitary Chemicals, July, August, September and October 1952. Especially good results have been obtained by using an alkyl benzene sodium sulfonate as the wetting agent. Another exemplary wetting agent is an alkyl phenoxy polyoxyethylene ether nonionic detergent.

In addition to the foregoing components of the composition, it is sometimes desirable to include as one of the components a small amount of a polyelectrolyte as described, for example, in U.S. Patent 2,625,529. Such polyelectrolytes are defined as synthetic water soluble polyelectrolytes having a weight average molecular weight of at least 10,000 and having a structure derived by the polymerization of at least one monoolefinic compound through the aliphatic unsaturated group, said structure being substantially free of cross linking. Representative are vinyl acetate-maleic anhydride copolymer and polyacrylates. Instead of the polyelectrolyte other substances which are effective in relatively small amounts as coagulating agents for aqueous suspensions of finely divided solids can be employed, including water-soluble cationic and anionic urea-formaldehyde and melamine-formaldehyde resins. The addition of such substances to the composition assists in preventing caking of the particles and in the formation of granular, dustless, free-flowing compositions. With such additions, it is possible at times to dispense with the binder.

Typical examples of formulae falling within the scope of the invention are as follows:

FORMULA I

| | Percent by weight |
|---|---|
| Boron compound | 20–90 |
| 1,3-substituted urea | 2–50 |
| 2,4-dichlorophenoxyacetic and/or 2,4,5-trichlorophenoxyacetic acid | 0.1–10 |
| Binder | 3–20 |
| Water.[1] | |

FORMULA II

| | |
|---|---|
| Boron compound | 20–90. |
| 1,3-substituted urea | 2–50. |
| Binder | Up to 20, 3–20 preferred. |
| Polyelectrolyte such as is described in U.S. Patent 2,625,529 | 0.1–5. |
| Water.[1] | |

FORMULA III

| | |
|---|---|
| Boron compound | 20–90. |
| 1,3-substituted urea | 2–50. |
| Binder | Up to 20, 3–20 preferred. |
| Water soluble urea-formaldehyde or melamine-formaldehyde polymer | 0.1–10. |
| Water.[1] | |

FORMULA IV

| | |
|---|---|
| Boron compound | 20–90 |
| 1,3-substituted urea | 2–50 |
| Binder | 3–20 |
| Wetting agent | Up to 2 |
| Water.[1] | |

[1] An amount sufficient to render the formula dustless, granular and free-flowing.

In addition to the foregoing illustrative formulae, other herbicidal agents of various types may be added to the basic formulae to give products that possess excellent herbicidal properties. For instance, chlorinated phenols, or their salts such as sodium pentachlorophenate, dinitro-ortho-secondary-butyl phenol, dinitrocresol, the several xanthates and the numerous trichloroacetic acid salts and esters, when incorporated into any of the above formulae add to the herbicidal activity of such formulae.

The boron compounds employed for the purpose of the invention in the above formulae include, for example, such solid inorganic boron compounds as the alkali metal and alkaline earth metal borates and their corresponding acids as well as several well known organic borate esters such as boron acetate, tricyclohexyl borate, tri-n-dodecyl borate, tri(methylamyl)borate, tri(tetrahydrofurfuryl)borate, tri(2-ethylhexyl)borate, tri-m,p-cresyl borate (containing trimetacresyl borate, tripara cresyl borate, and trixylyl borates). In the preferred practice of the invention, however, borax (sodium tetraborate) in either its refined or crude state has given excellent results. Typical analyses of these two particular borates are as follows:

I.—Crude borax ore

Chemical analysis: Weight percent
- Boric oxide ($B_2O_3$) _____ 34.0
- Sodium oxide ($Na_2O$) _____ 15.3
- Iron oxide ($Fe_2O_3$) _____ 0.3
- Aluminum oxide ($Al_2O_3$) _____ 0.8
- Titanium oxide ($TiO_2$) _____ 0.8
- Silica ($SiO_2$) _____ 2.8
- Calcium oxide ($CaO$) _____ 0.7
- Magnesium oxide ($MgO$) _____ 0.9
- Carbon dioxide ($CO_2$) _____ 0.6
- Water ($H_2O$) _____ 44.6
- Water insoluble _____ 6.0

II.—Fine granulated borax

- Boron trioxide ($B_2O_3$) _____ 36.3–38.3
- Sodium oxide ($Na_2O$) _____ 16.2–17.1
- Water ($H_2O$) _____ 44.6–47.5
- Anhydrous borax ($Na_2B_4O_7$) _____ 52.5–55.4
- Equivalent borax ($Na_2B_4O_7 \cdot 10H_2O$) _____ 99.5–105.0

The 1,3-substituted ureas employed for the purpose of the invention in the above formulae are disclosed, for example in U.S. Patents 2,655,444, 2,655,445, 2,655,446 and 2,655,447. A preferred 1,3-substituted urea for the practice of the invention is CMU, the trade name for 3-para-chlorophenyl-1,1-dimethyl urea. It will be understood that unless otherwise indicated the CMU is 80% active with the balance of the materials consisting of a wetting agent and inert ingredients. Other specific examples of phytotoxic 1,3-substituted ureas are 3-para-chlorophenyl-1,1-dimethyl thiourea, 3-phenyl-1,1-dimethyl urea, and 3-(3,4-dichlorophenyl)-1,1-dimethyl urea.

The solid boron compound is preferably employed in a predominating amount with respect to each other ingredient in the composition, so that it is the ingredient present in the greatest weight proportion, and it is further preferred that it constitute a major weight proportion of the composition. The phytotoxic 1,3-substituted urea is preferably present in a minor weight proportion. In producing both initial and residual destruction of unwanted vegetation, the preferred weight ratio of the phytotoxic urea to the boron compound, the latter being calculated as its borax equivalent, i.e., as sodium tetraborate decahydrate, is in the range of about 1:1 to 1:25. A ratio in the range of about 1:9 to 1:13 is further preferred.

The invention is further illustrated by the following compositions:

COMPOSITION 1

Percent by weight
- Borax _____ 90.25
- CMU _____ 9.00
- Vinyl acetate-maleic anhydride copolymer polyelectrolyte as described in U.S. Patent 2,625,529 _____ 0.75

COMPOSITION 2

Percent by weight
- Borax _____ 83.0
- CMU _____ 8.0
- Modified urea-formaldehyde anionic resin (see U.S. Patent 2,407,376) _____ 1.0
- Sodium pentachlorophenate _____ 8.0

COMPOSITION 3

- Borax _____ 82.6
- CMU _____ 8.3
- Vinyl acetate-maleic anhydride copolymer polyelectrolyte as described in U.S. Patent 2,625,529 __ 0.8
- Sodium pentachlorophenate _____ 8.3

COMPOSITION 4

- Borax _____ 90.0
- CMU _____ 4.5
- Dry sodium aluminate 72% by weight _____ 4.5
- Modified urea-formaldehyde anionic resin (see U.S. Patent 2,407,376) _____ 0.5
- Alkyl benzene sodium sulfonate _____ 0.5

COMPOSITION 5

- Borax _____ 82.2
- CMU _____ 8.1
- Sodium carbonate _____ 8.1
- Modified urea-formaldehyde anionic resin (see U.S. Patent 2,407,376) _____ 0.8
- Alkyl benzene sodium sulfonate _____ 0.8

COMPOSITION 6

- Borax _____ 81.9
- CMU _____ 9.9
- Dextrin _____ 6.0
- Alkyl benzene sodium sulfonate _____ 1.1
- 2,4-dichlorophenoxyacetic acid _____ 1.1

COMPOSITION 7

- Borax _____ 83.0
- CMU _____ 10.0
- Dextrin _____ 6.0
- Alkyl benzene sodium sulfonate _____ 1.0

COMPOSITION 8

- Borax _____ 85.1
- CMU _____ 10.3
- Calcium lignosulfonate (Lignosol B.D.) _____ 4.6

COMPOSITION 9

- Borax _____ 83.0
- 3-para-chlorophenyl-1,1-dimethyl thiourea _____ 10.0
- Dextrin _____ 6.0
- Alkyl benzene sodium sulfonate _____ 1.0

The new compositions are very effective against diverse types of unwanted vegetation, producing long-term destruction including initial kill and subsequent continued kill, when applied to the ground at rates of about 16 pounds per acre and greater of phytotoxic urea. Preferably, the rate of application is about 16–48 pounds per acre based on the content of phytotoxic urea, which corresponds to about 200 to 600 pounds per acre of the preferred compositions. The rate of application selected represents an amount of the urea less than that which when applied alone would produce the desired equivalent long-term destruction, resulting in a considerable reduction in the expensive urea compound requirements. The amounts of boron compound applied in the composition at the foregoing rates would alone produce no substantial destruction of the vegetation.

The preferred compositions of those listed above are prepared by blending the borax and the phytotoxic 1,3- substituted urea with minor amounts of dextrin, waste wood pulp liquor, other degraded starchy polysaccharides, or other water soluble binders, such as water soluble lignosulfonates, and sufficient water (usually 2% to 8% by weight of the total mix) to produce a granular material. Exceptionally good granulation may be achieved by including in the compositions small amounts of coagulants for solids, such as polyelectrolytes of the type described in U.S. Patent 2,625,529, as well as water-soluble modified urea-formaldehyde and melamine-formaldehyde resins, especially cationic resins, of the type used in the production of wet strength paper.

The quantity of water will depend upon the type of binder because some binders have a greater tendency to absorb water than others. The water absorptive characteristics of degraded starchy polysaccharides, such as dextrin can vary widely depending upon the amount of degradation.

The binder, such as dextrin, may be either incorporated into the dry mixture and the water subsequently added, or the binder can be dissolved or slurrried in the water and then added to the dry mixture of the other components. If the latter procedure is used, smaller amounts of water may be used without impairing the quality of the product produced.

In the preferred process the dried ingredients are generally mixed together until a homogeneous dry mass has been obtained. Water is then added in small amounts at intervals and the mixing or agitation continued until a suitable granular product is obtained. The amount of water added should be insufficient to cause the granules to become sticky but at least sufficient to produce a formula which is dustless and preferably free-flowing.

The type of mixing equipment employed affects the amount of water required. In larger scale equipment granulation can be obtained with smaller amounts of water than in laboratory equipment.

After blending and mixing, the composition is preferably removed from the mixing equipment and dried so that the moisture content thereof is adjusted to the point where the material is dry to the touch and yet is dustless and does not tend to cake or stick. The drying of the materials can be done either by exposure to atmospheric conditions or by heating, for example, by infra red light or any other suitable manner.

In order to further assure a uniform product, it is desirable that the moisture-adjusted particles be passed through screening, sifting, crushing or similar devices. It has been found surprisingly that the particle size of a finished product made in accordance with the practice of the invention can be controlled and substantial uniformity obtained by incorporating with the composition minor amounts of polyelectrolytes such as those disclosed in U.S. Patent 2,625,529.

The invention will be further illustrated but is not limited by the following examples. The proportions are by weight.

EXAMPLE 1

About 8 parts of water was added to 100 parts of composition 7 and agitated therewith. 100 gram samples were then treated with 0.3% of a polyelectrolyte described in U.S. Patent 2,625,529. Upon drying, the treated granules showed fewer caked particles and the particle size was extremely uniform. 50 grams of the treated material were then hand agitated on a 40 mesh screen. At the end of one minute 2.4 grams passed through the screen and 47.3 grams were retained. The other 50 gram sample was placed on a mechanical agitator equipped with a 40 mesh screen and at the end of ten minutes 3.8 grams passed through the screen with 45.8 grams remaining.

EXAMPLE 2

The procedure was the same as in Example 1 except that the granules were treated with a 0.1% concentration of sodium polyacrylate as the polyelectrolyte. Again, using a 40 mesh hand screening operation and 50 gram samples, 45.2 grams were retained and 4.6 grams passed the screen at the end of one minute. A ten minute mechanical screening using a 40 mesh screen allowed 6.2 grams to pass with 43.5 grams being retained.

EXAMPLE 3

Composition 8 is granulated by mixing the following composition and processing as previously described:

| | Percent by weight |
|---|---|
| Borax | 83 |
| CMU | 10 |
| Calcium lignosulfonate | 4.5 |
| Water | 2.5 |

The calcium lignosulfonate is a dried product containing 40–42% tannins, analyzing 6–8% CaO, and having a pH in 50% aqueous solution of 4–5.5. Other water-soluble lignosulfonates may be substituted, such as ammonium and alkali metal, particularly sodium, lignosulfonates.

In a similar manner the boron compound and the 1,3-substituted urea can be prepared in a granular free-flowing form by adding water thereto, preferably with the inclusion of a water soluble binder, and granulating the mixture. Attempts to prepare compositions merely by mixing boron compound and the 1,3-substituted urea without water resulted in dusty compositions which were irritating and unsuitable for commercial application. The addition of an oil such as mineral seal oil alleviates the dust problem and does not interfere with the herbicidal activity of the resultant composition but the compositions obtained in this manner leave much to be desired because they are difficult to apply with commercial spreader apparatus. Such compositions pack in the spreader, making distribution almost impossible, or result in uneven flow of the material from the spreader. Accordingly substantially oil-free granular compositions are provided for the purpose of this invention, to provide a practicable and commercially useful herbicidal composition which it is feasible to apply rapidly and reliably to large areas.

The following example illustrates the utility of the compositions of the invention and particularly demonstrates their residual effect as compared with the 1,3-substituted urea per se to which no boron compound has been added.

EXAMPLE 4

A series of tests was made in the New Orleans sector of Louisiana in an area abundant in Johnson, Bermuda and nut grass with some clover, peppergrass, marsh foxtail, swamp grass and wild geranium also being present. The area was divided into 5-foot by 20-foot plots which were numbered 1, 1'; 2, 2'; etc. Duplicate samples were placed on the corresponding numbers. The day chosen for applying the various materials was late in March and the weather overcast with the temperature being about 60° F. For months prior to the tests abnormally large amounts of precipitation had occurred so that all of the plant growths were dense and lush.

Compositions containing only CMU were applied in amounts corresponding to 20 pounds, 40 pounds, 60 pounds, 80 pounds and 100 pounds per acre. Compositions corresponding to Composition 7 were applied in amounts of 200 pounds, 400 pounds and 600 pounds per acre. Since Composition 7 contains 10% CMU these last named compositions contained a CMU content of 20 pounds, 40 pounds and 60 pounds per acre, respectively. At 80% activity for the CMU, the corresponding rates of application of 3-para-chlorophenyl-1,1-dimethyl urea were 16, 32, and 48 pounds per acre.

Observations were made 41 days after application and again 159 days after application. The results are given in the following table:

TABLE I

| Composition and rate of application | Plot No. | Observations | |
|---|---|---|---|
| | | Made 41 days after application | Made 159 days after application |
| CMU at 20 lbs. per acre | 6 | 60% kill. Johnson, Bermuda and nut grass growth | No apparent damage. |
| | 6' | 90% kill. Johnson, Bermuda and nut grass growth | No apparent damage. |
| CMU at 40 lbs. per acre | 7 | 95% kill. Small amounts of Bermuda and nut grasses growing. | 30% total kill. Seedling Bermuda and heavy nut grass growing. |
| | 7' | 95% kill. Some nut grass and one clump of Johnson grass growing. | 20% total kill. Bermuda, nut and Dallas grasses regrowth. |
| CMU at 60 lbs. per acre | 8 | 95% grass kill. Plot had spread out | 50% total kill. Nut and Johnson grasses and Foxtail regrowth. |
| | 8' | 95% grass kill. Plot had spread out 10 in. on each side. | 50% total kill. Nut, marsh grasses and Foxtail regrowth. |
| CMU at 80 lbs. per acre | 9 | Same as plots 7 and 8 above | 75% total kill. Only seedling Bermuda grass growing. |
| | 9' | Near 100% kill. Some small growth of nut grass | 90% total kill. Some nut and Bermuda grasses regrowth. |
| CMU at 100 lbs. per acre | 10 | 98% kill | 95% total kill. Nut and marsh grasses; Foxtail regrowth. |
| | 10' | Same as plot 9 above | 95% total kill. All new growth nut and Bermuda grasses. |
| Composition 7 at 200 lbs. per acre. | 11 | 80% kill. Nut, Johnson and Bermuda grasses growth. | 30% total kill. Nut, Johnson and Bermuda grasses regrowth. |
| | 11' | 90% kill. Nut grass growing throughout plot | 40% total kill. Nut and Bermuda grasses and Foxtail regrowth. |
| Composition 7 at 400 lbs. per acre. | 12 | 98% kill. Some nut grass growing | 90% total kill. Seedling nut and Bermuda grasses growth. |
| | 12' | 95% kill. Some nut grass growing | 90% total kill. Bermuda and nut grasses and Foxtail growth. |
| Composition 7 at 600 lbs. per acre. | 13 | 98% kill. Some nut grass growing | 90% total kill. Seedling Bermuda and nut grasses growth. |
| | 13' | 95% kill. Some nut grass growing | 90% total kill. Nut grass regrowth. |

It will be observed that the rate of kill with all compositions was relatively high 41 days after application but the residual effect of the composition containing the boron compound was much higher than the residual effect of the same concentration of CMU. Thus, the CMU after 159 days showed no residual effect when applied initially at the rate of 20 pounds per acre, while Composition 7, which contained the same concentration of CMU, showed a 30–40% residual effect after the same period of time. A comparison of test plots 7, 7' with test plots 12, 12' shows a residual effect of 90% total kill after 159 days in the case of plots 12, 12' as contrasted with a residual effect of only 20–30% total kill after the same period of time in the case of test plots 7, 7', even though the relative concentration of CMU is the same in both cases.

Insofar as herbicidal activity was concerned, the same phenomenon of greater residual kill with the compositions containing a boron compound and CMU was also observed when such compositions were compounded with an oil such as mineral seal oil. However, the presence of as little as 2% oil was found to cause packing in spreaders, so that it could not be distributed satisfactorily.

The combined effect obtained by the conjoint use of the 1,3-substituted urea and the boron compound is more than merely additive. Only relatively small amounts of the compositions of the invention are required in order to obtain superior long-term killing effects of noxious vegetation, the residual destructive action extending beyond the first growing season or year to the following seasons. To obtain any substantial killing effects with boron compounds such as borax, very large amounts are required and even then the results leave much to be desired. For example, in one series of tests borax applied at the rate of 200–400 pounds per acre to grass test plots containing young rye grasses produced no substantial effect after 39 days, whereas compositions containing 10% by weight of CMU and about 85% by weight of borax applied at the rate of 200–400 pounds per acre produced a 100% kill in 25 days. In another series of tests made on test plots containing quack grass, blue grass together with minor growths of Canada thistle, milkweed, bindweed and other broadleaf species, borax applied at the rate of 5200 pounds per acre produced only a slight killing effect after 83 days, while a composition containing 85% borax and 10% CMU applied at the rate of 400 pounds per acre gave 100% grass kill in 37 days and 100% total kill in 83 days. After 420 days the plots to which the compositions containing both borax and CMU had been applied still showed a 97% total kill.

EXAMPLE 5

This example demonstrates the residual effect of a composition according to the invention as compared with CMU alone and with borax alone. The results demonstrate that the residual kill is about double that provided by the CMU alone, and borax at an even greater dosage produced no residual kill.

Comparative compositions were evaluated over the period from June 29 of one year through May 31 of the second succeeding year, a period of twenty three months. The compositions were applied to test plots 100 square feet in area divided from a large lot located near Chicago, Illinois. Growing on the plots were weds typical in species to those ocmmonly occuring in the midwestern area of the United States, and they contained from between 80% to 90% of perennial grasses. At no time after the start of the test period was any additional chemical treatment applied to the test plots, and the vegetation was allowed to exist under the natural environmental conditions of its surroundings. Upon inspection of the plots at the end of the period, the following results were obtained for the several compositions:

| Plot No. | Composition | Dosage, lbs./acre | Percent kill |
|---|---|---|---|
| 1 | Borax | 600 | 0 |
| 2 | CMU | 20 | 20 |
| 3 | Composition 7 | 200 | 50 |
| 4 | CMU | 40 | 50 |
| 5 | Composition 7 | 400 | 90 |

EXAMPLE 6

Composition 8 was compared in field tests with CMU and with borax alone. Composition 8 was also compared with a like composition in which sodium chlorate was substituted for CMU(D), and with a further borax-chlorate composition containing the ingredients in the ratio of 3:1 as has been recommended for such a composition. The test was for a 127 day growing season commencing on May 19. The experiments were run in duplicate on 100-square-foot plots, leaving an equal untreated control between each treated plot.

The test area consisted of a fertile dark soil which had received no previous chemical treatment. The area had been partially burned off by fire approximately one month before treatment, but was entirely green at the treatment date. The area consisted almost entirely of perennial or biennial weeds and perennial grasses. Early grass growth consisted mainly of Canadian blue grass, with minor amounts of quack grass, red top and prairie cordgrass. Later perennial grasses included big blue stem and tall oat grass. The predominant weed was hedge bindweed. Lesser amounts of tall and bull thistle, compass plant, sweet clover, dogbane and milkweed were present early in the season. Summer perennial weeds appeared later in the season, and consisted of boneset, sun flower, blaznual ragweed and annual foxtail grass germinated in some plots, once the perennial vegetation had been reduced by the treatments.

The composition according to the invention was granular Composition 8 as described above. The CMU applied alone was formed into pellets by extruding a mixture of water-moistened CMU and 5% of the total mixture of dextrine, through a 20-mesh screen. The air-dried pellets were then bulked with ⅔ of a quart of vermiculite and applied to the plots. The results of applying the several compositions in granular form are tabulated below:

| Test No. | Formulation | Pounds per Acre | | | Percent Final average Kill | |
|---|---|---|---|---|---|---|
| | | Total | CMU | Borax | Broadleaf | Grass |
| A | Composition 8 | 200 | 20 | 166 | 35 | 85 |
| | | 300 | 30 | 249 | 80 | 92 |
| | | 400 | 40 | 332 | 85 | 99 |
| B | Borax | 200 | 0 | 200 | 0 | 0 |
| | | 300 | 0 | 300 | 0 | 0 |
| | | 400 | 0 | 400 | 0 | 0 |
| | | 1000 | 0 | 1000 | 30 | 20 |
| C | CMU | 21 | 20 | 0 | 5 | 15 |
| | | 31.6 | 30 | 0 | 5 | 25 |
| | | 42.2 | 40 | 0 | 5 | 25 |
| | | | Chlorate | | | |
| D | Chlorate/Borax (Chlorate =NaClO₃). | 200 | 16 | 166 | 0 | 0 |
| | | 300 | 24 | 249 | 0 | 0 |
| | | 400 | 32 | 332 | 0 | 0 |
| E | Chlorate/Borax | 200 | 50 | 150 | 0 | 0 |
| | | 300 | 75 | 225 | 5 | 10 |
| | | 400 | 100 | 300 | 15 | 25 |

The results demonstrated great superiority of the composition according to the invention over CMU alone or borax alone. The borax-chlorate compositions at the same rate of application gave little or no control of the vegetation. In particular, Test D comparable to the proportions of composition 8 exhibited no kill whatsoever at the end of the test period. In this connection, the chlorate was pure and the proportions are the same as those for the active content in the CMU of Composition 8, Test A, which active content is 80%.

To achieve good herbicidal activity with 1,3-substituted urea such as CMU, it is necessary that the material contact the ground so that it can pass into the root system of the vegetation. If the material is applied as a spray to heavy growths of vegetation, substantial amounts are retained on the upper green portions of the plant life and are transferred into the plant system only with difficulty. Moreover, compounds such as CMU even if placed on the ground in a powder form do not always achieve substantial weed killing effects because they are washed away from the treated areas by precipitation.

The compositions of the present invention being in granular form when they are applied to vegetation tend to penetrate or work their way through the upper vegetational growth and disperse upon the ground. Once they have contacted the soil, local zones of high concentrations are established and the materials gradually percolate through the soil and into the root system where they are effectively absorbed by the plants.

The invention is hereby claimed as follows:

1. A composition comprising a phytotoxic 1-alkyl-3-phenyl substituted urea which is normally a water insoluble dusty powder and a hydrated alkali metal borate, said composition being in the form of granules in which said substituted urea and said borate are intimately associated, said granules being further characterized by the fact that they contain a minimum of at least 2% by weight of said substituted urea, that they contain a predominating proportion of said borate, calculated as borax, as compared with said substituted urea, that they are non-packing in spreaders, and are dustless and free-flowing, the weight ratio of said urea to said borate, calculated as its borax equilavent, being within the range of about 1:9 to 1:25.

2. A composition as claimed in claim 1 in which said substituted urea is 3-para-chlorophenyl-1,1-dimethyl urea.

3. A composition consisting essentially of a phytotoxic 1-alkyl-3-phenyl substituted urea which is normally a water insoluble dusty powder and a hydrated alkali metal borate intimately associated with one another in the form of granules characterized by the fact that they contain a minimum of at least 2% by weight of said substituted urea, a minimum of about 82% by weight of said hydrated borate, calculated as borax, and are dustless, free-flowing and non-packing in spreaders, the weight ratio of said urea to said borate, calculated as its borax equivalent, being within the range of about 1:9 to 1:25.

4. A composition consisting essentially of a phytotoxic 3-para-chlorophenyl-1,1-dimethyl urea which is normally a water insoluble dusty powder and a hydrated alkali metal borate intimately associated with one another in the form of granules characterized by the fact that they contain a minimum of at least 2% by weight of said 3-para-chlorophenyl-1,1-dimethyl urea, a minimum of about 82% by weight of said hydrated borate, calculated as borax, and are dustless, free-flowing and non-packing in spreaders, the weight ratio of said urea to said borate, calculated as its borax equivalent, being within the range of about 1:9 to 1:25.

5. A composition as claimed in claim 3 which contains 3% to 6% by weight of a water soluble binder.

6. A process of preparing a granular composition containing a phytotoxic 1-alkyl-3-phenyl substituted urea that is normally a water insoluble dusty powder which comprises granulating a mixture consisting essentially of a hydrated alkali metal borate and said phytotoxic 1-alkyl-3-phenyl substituted urea, said mixture containing at least 2% by weight of said 1-alkyl-3-phenyl urea and a predominating amount of said borate, calculated as borax, with respect to said substituted urea while adding 2% to 8% of water in the granulating process based on the total weight of the ingredients and using a weight ratio of said urea to said borate, calculated as its borax equilavent, within the range of about 1:9 to 1:25.

7. A process of preparing a granular composition containing a phytotoxic 1-alkyl-3-phenyl substituted urea that is normally a water insoluble dusty powder which comprises granulating a mixture consisting essentially of a hydrated alkali metal borate and said phytotoxic 1-alkyl-3-phenyl substituted urea, said mixture containing at least 2% by weight of said 1-alkyl-3-phenyl urea and an amount of said borate sufficient to produce a granular composition in which the granules contain at least 82% by weight of said borate, calculated as its borax equivalent while adding 2% to 8% of water in the granulating process based on the total weight of the ingredients and using a weight ratio of said urea to said borate, calculated as its borax equilavent, within the range of about 1:9 to 1:25.

8. A process of preparing a granular composition containing a phytotoxic 1-alkyl-3-phenyl substituted urea that is normally a water insoluble dusty powder which comprises mixing said substituted urea and a hydrated alkali metal borate containing at least 2% by weight of said substituted urea and at least about 82% by weight of said borate, calculated as its borax equivalent, to form a homogeneous dry mixture, adding water to said mixture in amounts sufficient to form granules when the mixture is agitated, the quantity of water being within the range of 2% to 8% by weight of the total ingredients and agitating and drying said mixture to form granules containing said substituted urea and said borate which are dustless, free-flowing and non-packing in spreaders, the weight ratio of said urea to said borate, calculated as its borax equivalent, being within the range of about 1:9 to 1:25.

9. A method of controlling the growth of noxious vegetation which comprises applying to the ground on which it is grown a growth-inhibiting amount of a granular composition in which the granules contain at least 2% by weight of a phytotoxic 1-alkyl-3-phenyl substituted urea which is normally a water insoluble dusty powder intimately associated with a hydrated alkali metal borate which is present in said granules in a predominating amount by weight, calculated as borax, as compared with said substituted urea, said composition as applied being dustless, free-flowing and free from quantities of oil which would cause it to pack in a spreader, and the amount of said borate being sufficient to enhance the residual phytotoxicity of said composition, the weight ratio of said urea to said borate, calculated as its borax equivalent, being within the range of about 1:9 to 1:25.

10. A method as claimed in claim 9 in which said granules contain at least 2% by weight of 3-para-chlorophenyl-1,1-dimethyl urea and at least about 82% by weight of said hydrated borate, calculated as borax.

11. A method as claimed in claim 9 in which said granules are applied at a rate corresponding to 16 to 48 pounds of said substituted urea per acre.

12. A composition comprising 3-p-chlorophenyl-1,1-dimethyl urea and borax, said composition being in the form of granules in which said urea and borax are intimately associated, said granules being further characterized by the fact that they contain a minimum of at least 2% by weight of said urea, that they contain a predominating proportion of borax as compared with said substituted urea, that they are essentially oil free, dustless and free flowing, and that the weight ratio of said urea to borax is within the range of 1:9 to 1:25.

13. A composition consisting essentially of a phytotoxic 3-p-chlorophenyl-1,1-dimethyl urea and borax intimately associated with one another in the form of granules characterized by the fact that they contain a minimum of at least 2% by weight of said 3-p-chlorophenyl-1,1-dimethyl urea, a minimum of about 82% by weight of borax, and are essentially dustless, free flowing and non-packing in spreaders, the weight ratio of said 3-p-chlorophenyl-1,1-dimethyl urea to borax being within the range of 1:9 to 1:25.

14. A composition consisting essentially of a phytotoxic 3-p-chlorophenyl-1,1-dimethyl urea and borax intimately associated with one another in the form of granules characterized by the fact that they contain a minimum of at least 2% by weight of said 3-p-chlorophenyl-1,1-dimethyl urea, a minimum of about 82% by weight of borax, contain 3% to 6% by weight of a water soluble binder, and are essentially dustless, free flowing and non-packing in spreaders, the weight ratio of said 3-p-chlorophenyl-1,1-dimethyl urea to borax being within the range of 1:9 to 1:25.

15. A process of preparing a granular composition containing a phytotoxic 3-p-chloro-phenyl-1,1-dimethyl urea that is normally a water insoluble dusty powder which comprises mixing said urea and borax together with a water soluble binder, the proportions of said urea being at least 2% by weight of the mixture, the proportions of borax being at least 82% by weight of the mixture, and the proportions of said binder being within the range of 3% to 6% by weight of the mixture, adding 2% to 8% by weight of water based on the total weight of the mixture, and agitating and drying the resultant mixture to form granules containing said urea and borax which are dustless, free flowing and non-packing in spreaders.

16. A method of controlling the growth of noxious vegetation which comprises applying to the ground on which it is grown a growth inhibiting amount of an essentially oil free granular composition in which the granules contain at least 2% by weight of 3-p-chlorophenyl-1,1-dimethyl urea, at least 82% by weight of borax and in which the weight ratio of said urea to borax is within the range of 1:9 to 1:25, said mixture being applied at a rate corresponding to 16 to 48 pounds of said urea present in the mixture per acre.

References Cited by the Examiner

UNITED STATES PATENTS

| | | | |
|---|---|---|---|
| 2,700,604 | 1/55 | Knight | 71—2.4 |
| 2,709,648 | 5/55 | Ryker et al. | 71—2.6 |
| 2,904,423 | 9/59 | Stone et al. | 71—2.4 |

OTHER REFERENCES

Crafts et al., "Toxicity of Arsenic Borax & Chlorates," in "Hilgardia," December 1936, vol. 10, No. 10, pages 411 and 412.

Litzenberger, "Effectiveness of Borax and Sodium Chlorate Borax Combinations for Control of Perennial Weeds," in Montana Agriculture Experiment Station War Circular 2, 1243, nine pp., page 7 particularly relied on.

LEWIS GOTTS, *Primary Examiner.*

MAURICE A. BRINDISI, *Examiner.*

UNITED STATES PATENT OFFICE
CERTIFICATE OF CORRECTION

Patent No. 3,203,780                            August 31, 1965

George W. Luvisi et al.

It is hereby certified that error appears in the above numbered patent requiring correction and that the said Letters Patent should read as corrected below.

Column 8, line 43, for "ocmmonly" read -- commonly --; column 9, lines 11 and 12, for "blaznual" read -- blazing star, asters and goldenrod. Minor amounts of annual --.

Signed and sealed this 27th day of September 1966.

(SEAL)
Attest:

ERNEST W. SWIDER                            EDWARD J. BRENNER
Attesting Officer                                    Commissioner of Patents